United States Patent
Kuze

[11] Patent Number: 5,621,526
[45] Date of Patent: Apr. 15, 1997

[54] INTERFEROMETER TO ELIMINATE THE INFLUENCE OF CLOUDS

[75] Inventor: Akihiko Kuze, Tokyo, Japan

[73] Assignee: NEC Corporation, Japan

[21] Appl. No.: 452,989

[22] Filed: May 30, 1995

[30] Foreign Application Priority Data

May 30, 1994 [JP] Japan ................ 6-116446

[51] Int. Cl.$^6$ .................................... G01B 9/02
[52] U.S. Cl. ............................ 356/345; 356/346
[58] Field of Search ................... 356/345, 346, 356/358

[56] References Cited

U.S. PATENT DOCUMENTS 4,544,272  10/1985  Doyle .................. 356/346

Primary Examiner—Samuel A. Turner
Assistant Examiner—Amanda Merlino
Attorney, Agent, or Firm—Ostrolenk, Faber, Gerb & Soffen, LLP

[57] ABSTRACT

An infrared interferometer, which includes a moving mirror, a fixed mirror, a beam splitter for delivering an interference light and a sensor for sensing the interference light, for observation of atmospheric spectra is equipped with a cloud observation arrangement for determining the cloud coverage ratio and the altitude of the top surface of a cloud, comprising a reflecting mirror for extracting a part of the interference light, a narrow-band-pass filter for A and B bands of oxygen molecules and a sensing element, the cloud observation arrangement enabling simultaneous observation with the atmospheric spectra observation to eliminate harmful influence of the cloud therefrom.

3 Claims, 2 Drawing Sheets

INTERFEROMETER TO ELIMINATE THE INFLUENCE OF CLOUDS

BACKGROUND OF THE INVENTION

1. Field of the Invention

The present invention relates to an infrared interferometer which may be mounted on aircrafts, satellites or the like for observation of atmospheric spectra, etc., and particularly to an interferometer which allows simultaneous correction to eliminate the influence of clouds.

2. Description of the Prior Art

Conventional approaches for atmospheric observation with an interferometer mounted on an aircraft, satellite or another flying body require a wide field of view and a sufficient amount of light flux to meet, for example, the requirement that both a high S/N ratio and high-spectral resolution be established simultaneously. Accordingly, the spatial resolutions of sensors for atmospheric observation are inferior to those of cameras for catching images of the earth's surface. In the case of such observation with sensors for atmospheric observation, there is a very high possibility that each pixel partially comprises a cloud. In addition, it is important to obtain information on the cloud coverage ratio (the ratio of the cloud present in each pixel) and the height of the top of the cloud (the height of the top surface of the cloud) for atmospheric observation since it is indispensable for making corrections to thereby eliminate the influence of the cloud.

An interferometer of the prior art which is mounted on aircrafts, artificial satellites or the like will now be explained with reference to FIG. 2. This type of interferometer comprises an infrared interferometer itself for observation of atmospheric spectra or the like and a cloud camera which uses a two-dimensional multi-element array detector for measurement of cloud distribution. First, the interferometer is constructed from a moving mirror 11, a fixed mirror 12, a beam splitter 13 and an interferometer detector 15. The incident light 14 from the subject of observation is separated by the beam splitter 13 into two beams directed to the moving mirror 11 and fixed mirror 12, respectively, which are then reflected by the respective mirrors to be modulated in interference light which is detected by the interferometer detector 15. On the other hand, the cloud camera comprises a cloud camera-detector 16 which is a two-dimensional multi-element array detector and a light-collecting optical system 17 which condenses light 18 incident from the subject of observation on the cloud camera-detector 16. The interferometer detector 15 is usually a single element, while the cloud camera-detector 16 is constructed and placed so that the image obtained by the single element is divided into fine, high-spatial-resolution images of the cloud.

Interferometers of the prior art which are mounted on satellites, etc., have the following drawbacks:

(1) The camera for measurement of cloud distribution is separated from the interferometer, and this construction increases the weight and size, for which reason the interferometer is not suitable for mounting on aircrafts, satellites, etc. In addition, the interferometer and camera may have different fields of view because of error in their mounting placement, and this difference interferes with making corrections to eliminate the influence of the cloud.

(2) The image captured by the camera only provides information regarding only whether a cloud is present or not in the pixel. Moreover, this information is not on spectra, and thus cannot be used to determine the height of the cloud.

SUMMARY OF THE INVENTION

It is an object of the present invention to provide an interferometer which is placed in an optical system therefor, comprises a filter and a sensor and allows simultaneous observation of the cloud coverage ratio of each pixel and the height of the top of the cloud and making corrections for eliminating the influence of the cloud.

It is another object of the present invention to provide an interferometer for measuring spectra of A and B bands of oxygen molecules through the use of part of a flux of light.

DETAILED DESCRIPTION OF THE PREFERRED EMBODIMENT

Figure 1:
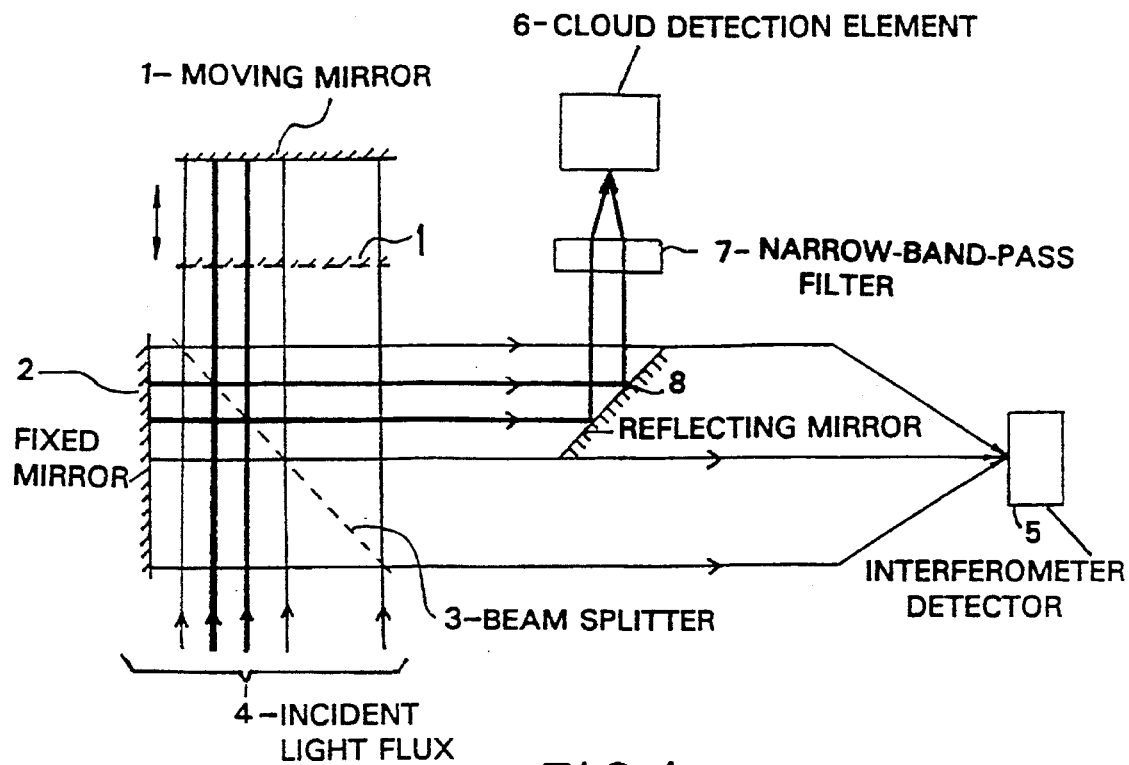
FIG. 1 is a schematic diagram of an embodiment according to the present invention.
Figure 2:
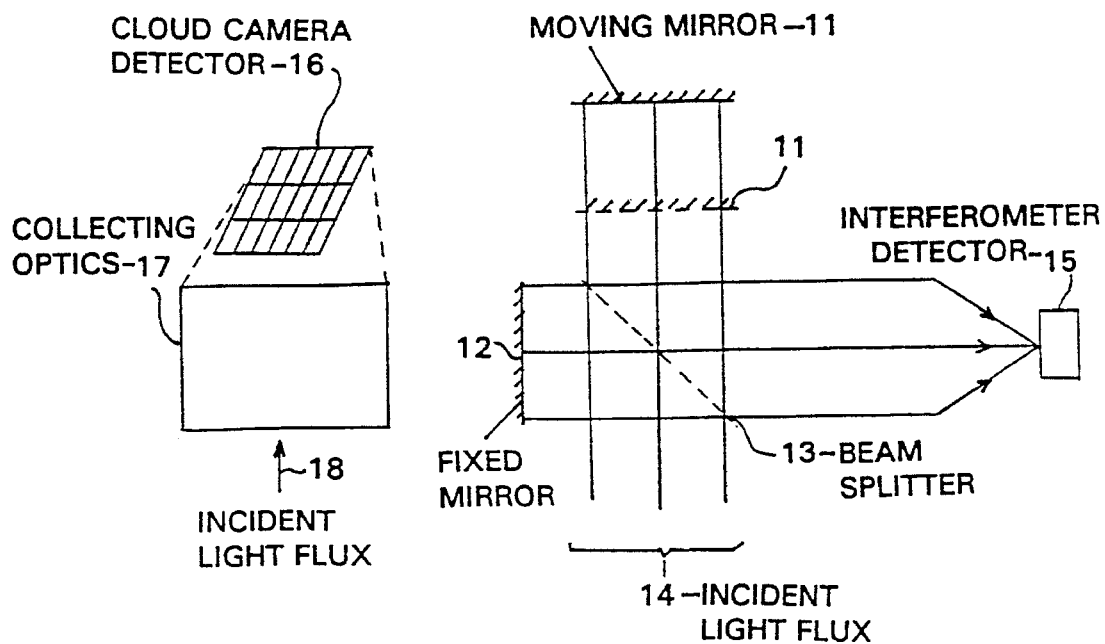
FIG. 2 is a view which shows the configuration of an interferometer of the prior art.

In FIG. 1 which shows an embodiment of the present invention, the incident light flux 14 is separated by a beam splitter 3 into two beams which are then reflected by a fixed mirror 2 and a moving mirror 1, respectively, and modulated in interference light flux by the beam splitter 3, and the interference light is detected by an interferometer detector 15. As shown by the thin lines in FIG. 1, beams of light travel throughout the moving mirror 1, fixed mirror 2 and beam splitter 3, and are finally condensed on the interferometer detector 5. With the interferometer according to the present invention shown in FIG. 1, of all the beams of light, only the beams of light shown by the thick lines are reflected after having been transmitted through the interferometer, to extract and observe the spectra of A and B bands of oxygen molecules for making corrections to eliminate the influence of the cloud. More specifically, only part of the beams of light which are defined by the thick lines in FIG. 1 is collected by using the reflecting mirror 8, and a narrow-band-pass filter 7 for detecting a cloud is used to extract light in A and B bands of oxygen molecules at around 760 nm and their vicinity, and interference light flux (interferogram) is detected by a cloud detection element 6.

Figure 3:
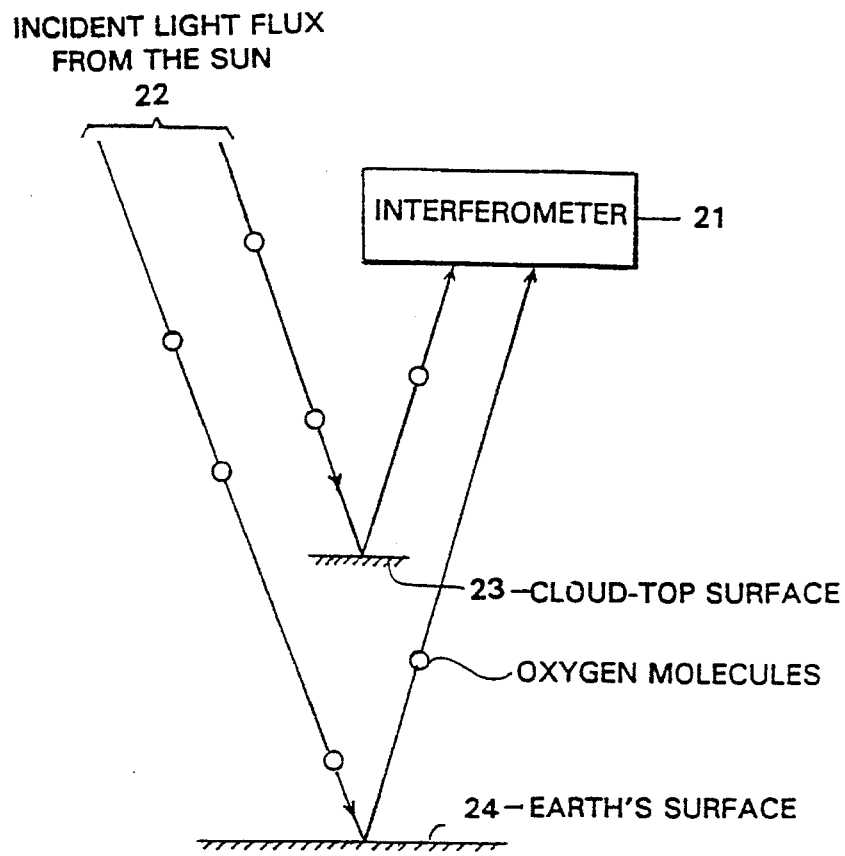
FIG. 3 is a view which illustrates the concept of ways to detect a cloud.

Fourier transformation of the interference light detected by the cloud detection element 6 provides high-resolution spectra of light in A and B bands of oxygen molecules and their vicinity. As is apparent from FIG. 3, the spectra of the detected light is the spectra of sunlight 22 reflected from the top 23 of the cloud or the earth's surface 24 and gathered by the interferometer 21 according to the present invention which is mounted on a flying body such as an aircraft or satellite, and are expressed by the following equation. Parts of the optical spectra of the light which are also found in the absorption bands of oxygen are absorbed by oxygen molecules which are present along the optical path, and the light is attenuated accordingly.

$$I\gamma = a_0 \times (1-r_1) \times I_0 exp(-b\gamma s_0) + a_1 \times r_1 \times I_0 \times exp(-b\gamma s_1).$$

In the above equation, the former term represents the value due to reflection from the earth's surface, while the latter term represents the value due to reflection from the top surface of the cloud.

$I\gamma$: Spectral radiance of light incident flux on the interferometer $I_0$: Spectral radiance of sunlight wavelength (wave number)

$r_1$: Cloud coverage ratio of each pixel $a_0$: Earth's surface reflectivity $a_1$: Cloud-top surface reflectivity $b\gamma$: Absorption cross section of oxygen molecules $s_0$: Total number of oxygen molecules along the optical path: sun→earth's surface→interferometer of the present invention $s_1$: Total number of oxygen molecules along the optical path: sun→cloud-top surface→interferometer of the present invention Of the above factors, $I_0$ (Spectral Radiance of sunlight), $a_0$ (earth's surface reflectivity), $b\gamma$ (absorption cross section of oxygen molecules) and $s_0$ (total number of oxygen molecules along the optical path: sun→earth's surface→interferometer of the present invention) have already known values.

Figure 4:
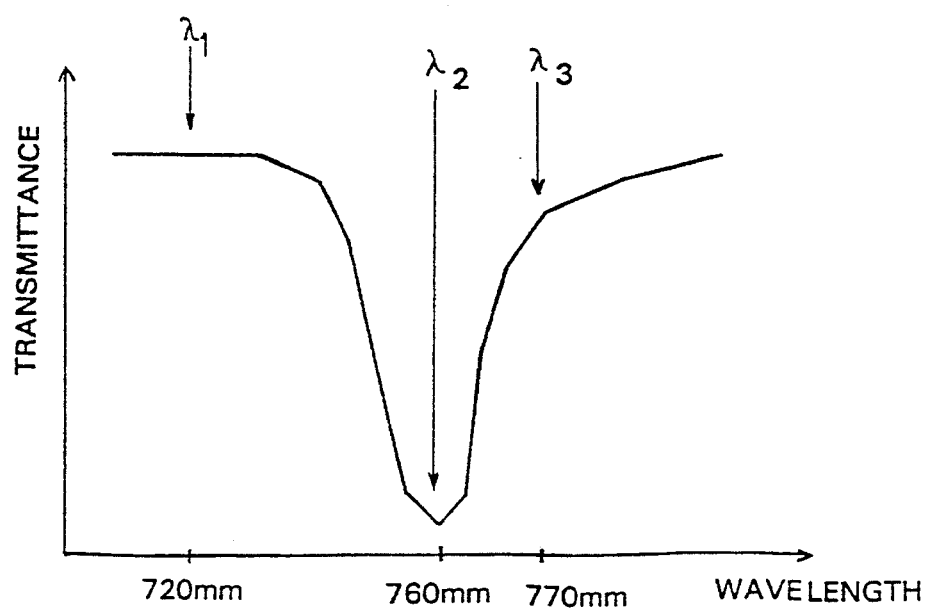
FIG. 4 is a view which shows the spectra of absorption bands of oxygen molecules and their vicinity.

As shown in FIG. 4, there exist wavelength bands with different absorption factors (wavelengths $\gamma_1, \gamma_2, \gamma_3$, etc.) near A and B bands of oxygen molecules which are present at around 760 nm. Of these spectra, $a_0 \times (1-r_1) + a_1 \times r_1$ may be determined from $b\gamma=0$ on the basis of the wavelength band of wavelength $\gamma_1$ or the like which is not absorbed.

In addition, three unknown variables $r_1$ (cloud coverage radio of each pixel), $a_1$ (cloud-top surface reflectivity) and $s_1$ (total number of oxygen molecules along the optical path: sun→cloud-top surface→interferometer) may be determined by solving the above equation on the basis of measurements with two wavelengths (wavelengths $\gamma_2, \gamma_3$) which have different absorption intensities (absorption cross sections), etc. Here, the "total number of oxygen molecules" is the sum of the products of the oxygen densities and optical path lengths at the respective altitudes, calculated for each altitude layer. Since the vertical distribution of oxygen is well known, determination of $s_1$ will naturally lead to the determination of the optical path length: sun→cloud-top surface→interferometer of the present invention. Accordingly, since the positions of the sun and the interferometer according to the present invention may be determined, the altitude of the top surface of the cloud may also be determined.

As demonstrated in the above embodiment, the device of the present invention may determine the cloud occupation ratio of each pixel and the altitude of the top surface of the cloud. Therefore, the present invention has the effect of simultaneously accomplishing observation of the atmosphere, etc. and making corrections to eliminate the influence of clouds on the observation.

What is claimed is:

1. An interferometer comprising:

an interference section having a moving mirror, a fixed mirror, a beam splitter for splitting an incident light to lead said incident light to said moving mirror and said fixed mirror and for combining reflected lights from said moving mirror and said fixed mirror to deliver an interference light, and a sensor for sensing said interference light; and a cloud sensor section receiving a part of said interference light for observing a cloud located between said interferometer and an earth surface by detecting a predetermined spectrum of oxygen molecules.

2. An interferometer as claimed in claim 1, wherein said cloud sensor section measures A and B bands of oxygen molecules.

3. An interferometer as claimed in claim 1, wherein said cloud sensor section comprises a reflecting mirror partially disposed in a light path between said beam splitter and said sensor of said interference section for extracting part of said interference light, a narrow-band-pass filter for receiving the interference light reflected by said reflecting mirror, and a sensing element for receiving a filtered interference light delivered from said narrow-band-pass filter.

\* \* \* \* \*